Figure 1:
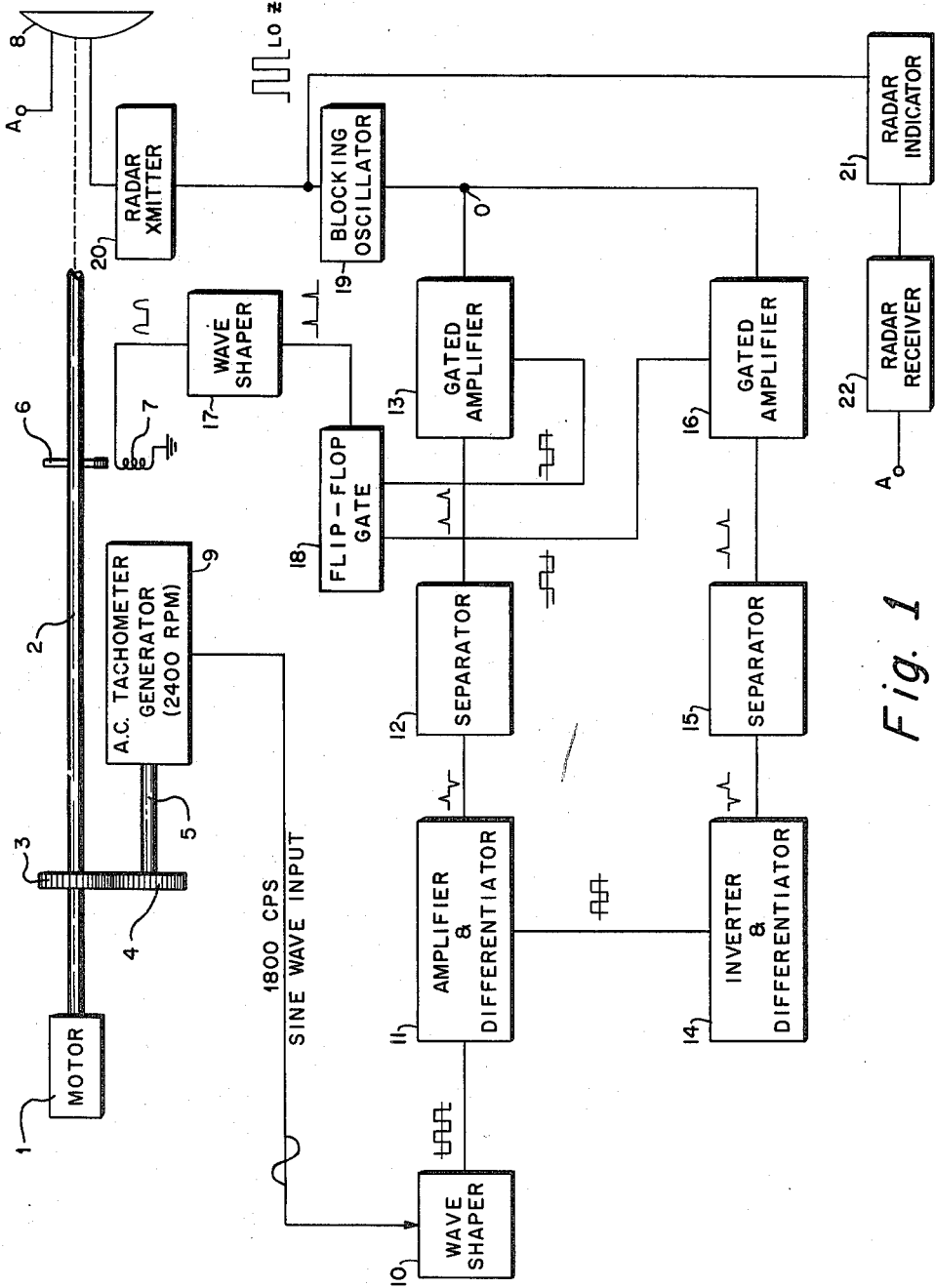

INVENTOR.
FRANK B. UPHOFF

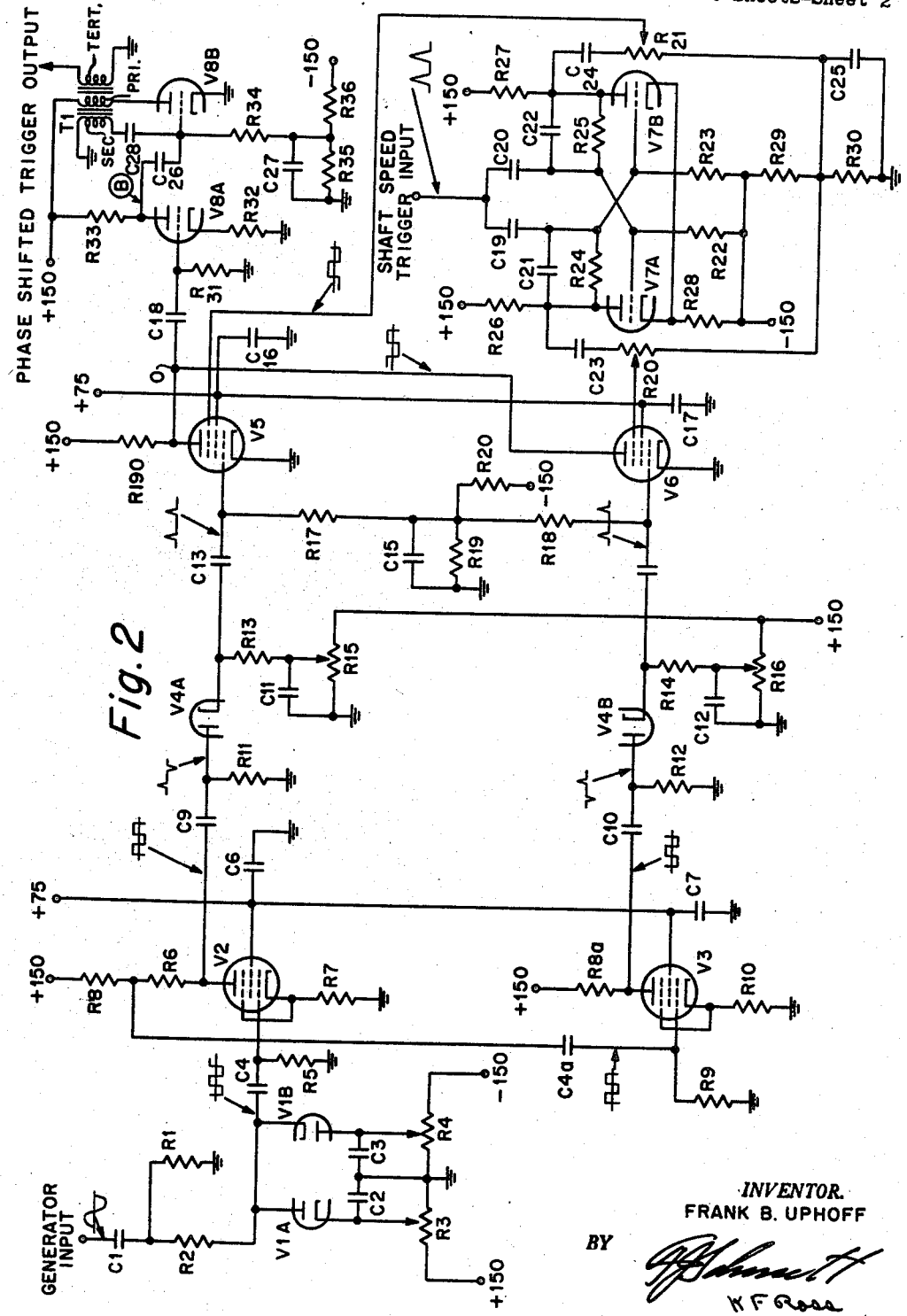

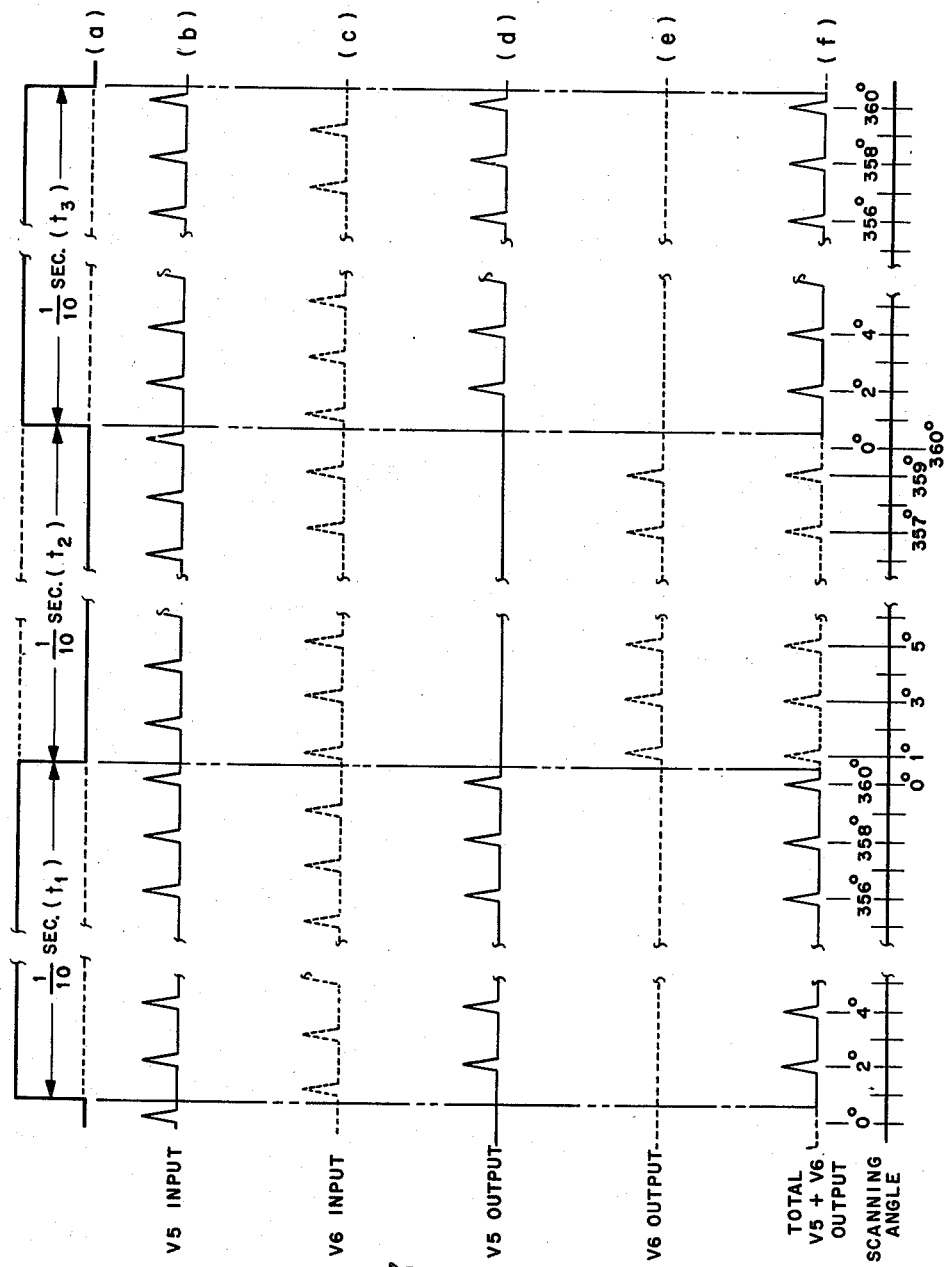

United States Patent Office 2,961,651
Patented Nov. 22, 1960

2,961,651
SYNCHRONIZED SYSTEM OF INTERLACED SCANNING

Frank B. Uphoff, Gravel Hill Road and Bustleton Pike, Churchville, Pa.

Filed Apr. 20, 1954, Ser. No. 424,533

7 Claims. (Cl. 343—11)

(Granted under Title 35, U.S. Code (1952), sec. 266)

The invention described herein may be manufactured and used by and for the Government of the United States of America for governmental purposes without the payment of any royalties thereon or therefor.

The instant invention relates to a synchronized system of interlaced scanning for a rapid scan radar system and more particularly relates to a means and method for use with applications such as radar systems wherein the inventive apparatus and method will cause the field illuminated by the antenna to be scanned in an interlaced manner while the indicator will also have an interlaced scanning pattern which is in locked synchronism with the scanning pattern of the antenna.

Prior methods of obtaining interlace in radar indicators relied on maintaining a fixed relationship between the antenna scan rate and the pulse repetition rate. This relationship is such that the time for one antenna scan (or field) corresponds to an integral number of radar pulses plus one half of a radar pulse period.

This method has the disadvantage of requiring a means of maintaining constant antenna rotational speed (servo speed control) and a means for stabilizing the pulse repetition frequency, e.g. automatic frequency control. Some of the disadvantages of the known methods were that absolute accuracy was required for the antenna rotational speed and the pulse repetition frequency in order to accomplish perfect interlace of the alternate fields. Imperfect interlace resulted from very small variations in antenna rotational speed or pulse repetition frequency. These variations caused the succeeding fields to drift (on B scan presentations) or rotate (on plan position indicator presentations). Percentage variations in either of these speeds caused a non-stationary, non-interlaced, indicator presentation. The instant invention does not depend on the relationship between antenna rotational speed and pulse repetition rate to obtain the desired interlaced scanning pattern. Interlace of the fields is obtained by shifting the phase of the trigger pulses (which determine the pulse repetition frequency) by exactly one half period and returning them to the original phase on alternate revolutions of the antenna. Since the timing of the trigger pulse determines both the antenna position at which the pulse is transmitted and the sweep line position on the indicator, a phase shift of one half period will cause the succeeding pulses to be transmitted and the indicator sweeps to be positioned midway between the pulses and the sweeps of the previous antenna revolution. The instant method and apparatus has a further advantage in that the pulse repetition frequency is generated with a generator which is coupled mechanically to the shaft producing the antenna rotation; this arrangement serves to always produce the same number of pulses per revolution, thereby causing the indicator pattern to be perfectly stationary regardless of variation in antenna speed.

Other advantages of the instant inventive apparatus and method are as follows:

(1) The interlaced scanning is independent of the antenna rotational speed.

(2) The stability of the indicator pattern (lack of rotation or drift) is independent of antenna rotational speed.

(3) Accuracy demands on antenna rotational speed are considerably lessened.

(4) The electronic circuitry is simplified.

(5) Performance requirements of the electronic circuitry are greatly decreased.

Accordingly, an important purpose of the instant invention is to provide an apparatus and method for producing an interlaced type of scan for oscilloscope indicators.

Another object of the invention is to provide a radar apparatus for interlaced scanning presentation wherein timing of the trigger pulse will determine both the antenna position at which the pulse is transmitted and the sweep line position on the indicator so that with a phase shift of one half period, succeeding pulses are caused to be transmitted and the indicator sweeps to be positioned at a point midway between the pulses and the sweeps of the previous antenna revolution.

Another object of the invention is to provide radar apparatus wherein the pulse repetition frequency of the transmitter of the radar apparatus is generated with means which are in turn coupled mechanically to the shaft producing antenna rotation to always produce the same number of pulses per revolution thereby causing the indicator pattern to be perfectly stationary regardless of variations in antenna speed.

Another important purpose of the invention is to produce radar apparatus wherein an interlaced scan presentation is to be made and in which interlaced scanning is independent of antenna rotational speed and stability of the indicator pattern, that is lack of rotation or drift, is independent of antenna rotational speed.

Still another aim of the invention is to provide a radar apparatus having an interlaced scan presentation wherein accuracy demands on antenna rotational speed are considerably lessened and providing simplified electronic circuitry wherein the performance requirements of the electronic circuitry are greatly decreased.

Still another aim of the instant invention is to present a synchronized system of interlaced scanning for a rapid scan electronic system which will be a self synchronous system.

Another object of the instant invention is to provide a synchronized system of interlaced scanning for a rapid scan radar system wherein the phase of the trigger pulses may be shifted for each antenna revolution.

Still another aim of the instant invention is to provide a synchronized system of interlaced scanning for a rapid scan radar system wherein the repetition frequency is determined by the antenna shaft rotational speed.

Another object of the invention of this application is to provide a synchronized system of interlaced scanning for a rapid scan radar system, for television, and for other applications which will provide a relatively stable and accurate interlaced pattern scan and which will require simplified electronic circuitry, which will be of greater accuracy, economical to produce, and require substantially fewer parts, and wherein necessity for close tolerances of parts and for exceptional accurate performance of individual circuits will be greatly lessened.

Other objects and many of the attendant advantages of this invention will be readily appreciated as the same becomes better understood by reference to the following detailed description when considered in connection with the accompanying drawings wherein:

Fig. 1 represents a block diagram of the apparatus of an illustrative embodiment of the invention with some parts shown in schematic representation and wherein important wave forms are shown for purposes of clarity of illustration, Fig. 2 is a schematic representation of the apparatus of the illustrative embodiment of Fig. 1 with wave forms illustrated for purposes of clarity of description, and Fig. 3 shows a series of graphs illustrating development of the wave form at the input to the blocking oscillator.

Referring to the drawings and in particular to the apparatus shown in the block diagram of Fig. 1, a motor 1 may be used to drive an antenna rotating shaft 2. Shaft 2 may be conventionally coupled mechanically to a scanning antenna 8. Disposed on shaft 2 may be a spur gear 3 which in turn may drive a second spur gear 4. Driven gear 4 may be disposed on an input shaft 5 of a conventional alternating current tachometer generator. The tachometer generator may have a speed of 2400 revolutions per minute (r.p.m.). Disposed on shaft 2 may be a pick off member 6. Disposed in proximity to pick off member 6 is a stator 7 in which a signal is generated each time pick off 6 makes a revolution with the shaft. The antenna rotating shaft may be rotating, for example, at a speed of 600 r.p.m. that is, ten cycles per second.

The alternating current tachometer generator may give a sine wave output of 1800 cycles per second as is well understood in the art. Since the alternating current tachometer generator is geared to the rotating shaft it will be synchronized with the antenna rotation. The 1800 cycle per second sine wave input is fed into a wave shaper 10 where the wave input is converted to a square wave output, as illustrated. The square wave output of the wave shaper is fed into an amplifier and differentiator 11 where the amplitude of the wave is amplified and the wave is differentiated to provide positive and negative trigger pulses.

A first output of the amplifier and differentiator sends a series of positive and negative trigger pulses to the input side of a first separator circuit 12 where the negative pulses are chopped off. A second output from the amplifier section of the amplifier and differentiator circuit consists of square waves 180° out of phase with the square wave input to the amplifier and differentiator. This second output is fed to an inverter and differentiator circuit 14 where trigger pulses are developed in the output, the trigger pulses being 180° out of phase with the trigger pulses fed to the first separator circuit. These last named inverter trigger pulses are fed to a second separator circuit 15 where the negative pulses are also chopped off. The outputs of the first separator and the second separator are each a series of positive peaks, the triggers in the output of the first separator being 180° out of phase with the triggers in the output of the second separator. The trigger pulses from the first separator are fed into a first gated amplifier 13 and the trigger pulses from the second separator are fed into a second gated amplifier 16.

The pulses generated for each revolution of the antenna rotating shaft are fed from stator 7 into a wave shaper 17, the output of the wave shaper being a ten cycle per second series of trigger pulses. The trigger pulses are fed to the input of a flip-flop gate circuit 18 to trigger that circuit. One output of the flip-flop gate circuit is fed to the first gated amplifier and a second output of the flip-flop gate circuit is fed to the second gated amplifier. Each output of the flip flop gate consists of a series of square waves, the square wave from the first output being 180° out of phase with the square wave output in the second output. Each output of the flip-flop gate may turn its respective gated amplifier on during the positive portion of the square wave output as will be explained in greater detail further below. In that manner, the first gated amplifier is on while the second gated amplifier is off and the second gated amplifier is on during the period that the first gated amplifier is off.

The outputs of the two gated amplifiers are tied to a common point at O. The resultant wave form output of the gated amplifier is illustrated graphically in Fig. 3 and will be described in greater detail after a more complete description of the circuitry of Fig. 1, as shown in Fig. 2, is given.

A blocking oscillator 19 is provided at the mutual output at point O of the gated amplifiers to produce a series of corresponding trigger pulses having fast rise and fall time, and presenting a low impedance output to trigger the indicator system to be used in conjunction with the antenna system of the present invention. As indicated in Fig. 1, oscillator 19 supplies trigger pulses to a conventional radar transmitter 20, coupled to antenna 8, and to the sweep circuit of an indicator 21, coupled through a radar receiver 22 to antenna 8. Receiver 22 and indicator 21 are conventional.

Referring more particularly to the schematic representation of Fig. 2, the generator input from the alternating current tachometer generator is fed through appropriate coupling consisting of capacitor $C_1$ and resistor $R_1$. The input voltage from the generator input is developed across resistor $R_1$. Resistor $R_2$ represents a coupling resistor to couple the generator input to the plate of the first half of a diode V1A as, for example, a 6AL5. Resistor $R_2$ also develops the plate load from diode V1A. Attached to the plate of V1A is the cathode of the second half of the twin diode V1B. The plate of the diode V1B is attached to the wiper arm of a potentiometer $R_4$. The cathode of the half of the 6AL5 represented by diode V1A is attached to a second potentiometer arm which is connected at its contact point to the resistance portion of potentiometer $R_3$. Through $R_3$ the potentiometer is connected to a positive 150 volt D.C. source. The other side of the resistance of potentiometer $R_3$ is connected to ground. The plate of V1B tied to the contact arm of potentiometer $R_4$ extends through the resistance portion of $R_4$ to a negative 150 volt D.C. voltage source. The other side of the resistance portion of potentiometer $R_4$ is connected to ground. A pair of capacitors $C_2$ and $C_3$ are attached respectively to the cathode of V1A and to to the plate of V1B. The generator input is a series of sine waves at 1800 cycles per second. V1A and V1B, a conventional wave shaper presents a series of square waves at the output. The square wave output of V1A and V1B is fed through coupling capacitor $C_4$ to the grid of a pentode amplifier $V_2$. The input square wave signal is developed across resistor $R_5$. Biasing voltage is provided across cathode resistor $R_7$. The cathode is tied to the suppressor grid to provide proper suppressor grid voltage. The plate load of $V_2$ is developed across resistance $R_6$. $R_8$ provides additional plate load. A point between resistors $R_6$ and $R_8$ is tapped and feeds the plate signal of $V_2$ to the coupling capacitor of a second pentode inverter, through coupling capacitor $C_4a$ which is tied to the grid of the inverter tube $V_3$. Input signal is developed across resistor $R_9$. Bias voltage is supplied to the cathode through resistor $R_{10}$. Cathode and suppressor are tied together. Capacitors $C_6$ and $C_7$ provide a signal by pass path to ground. The two screens are tied to a positive 75 volt source. Output of $V_2$ taken off the plate consists of a series of square waves which have been inverted and amplified. Output of tube $V_3$ comprises a series of square waves 180° out of phase with the output square waves of $V_2$. Capacitor $C_9$ and resistance $R_{11}$ form a differentiator circuit and resistance $R_{12}$ and capacitance $C_{10}$ form a second differentiator circuit to change the square wave output of $V_2$ and $V_3$ respectively to a differentiated trigger pulse output, the differentiated wave of $V_2$ being 180° out of phase with relation to the differentiated output of tube $V_3$. A pair of separator circuits V4A and V4B serve to eliminate the negative pulses from each of the trigger pulse input to these stages. A 6AL5 has been found suitable for the purpose. Output of the differentiator $C_9$ and $R_{11}$ is impressed on the plate of V4A, output being taken from $R_{13}$ which is in the cathode circuit of V4A. One side of $R_{13}$ is attached to the cathode of V4A, the other side being attached to the slidable contact of a potentiometer $R_{15}$. One side of the potentiometer $R_{15}$ is connected to ground, the other side being connected to a positive 150 volt D.C. source. Capacitor $C_{11}$ presents a signal by pass capacitor from the slider arm of potentiometer $R_{15}$ to ground. Corresponding separation of the output of $V_3$ as differentiated across $C_{10}$ and $R_{12}$ is provided by tube V4B, the functions of $R_{14}$, $R_{16}$ and $C_{12}$ respectively corresponding to the functions of $R_{13}$, $C_{11}$ and $R_{15}$ respectively. As in the case of $R_{15}$, $R_{16}$ has one end tied to ground, the other end being tied to a 150 volt D.C. source. Potentiometers $R_{15}$ and $R_{16}$ provide a clipping level for the output of the separator stages. Thus output positive pulses from V4A and V4B can be adjusted to give equal positive amplitude. The output of V4A thus comprises a series of positive pulses and the output of separator V4B presents a series of positive pulses 180° out of phase with the positive pulses of V4A. A pair of 6AS6 tubes may be used as gated amplifiers to provide switching for the outputs of separators V4A and V4B respectively. Through coupling capacitor $C_{13}$ the signal from separator V4A is developed across $R_{17}$ and fed to the grid of the gated amplifier $V_5$. Similarly through coupling capacitor $C_{14}$ the signal from V4B is fed and developed across resistance $R_{18}$. $R_{17}$ and $R_{18}$ are tied at one end to the grids of respective tubes $V_5$ and $V_6$ and at their other end are joined to a common point. $R_{19}$ and $R_{20}$ provide a voltage divider to supply proper bias to $V_5$ and $V_6$. $C_{15}$ is a signal by pass capacitor to provide signal ground at the junction point between $R_{17}$ and $R_{18}$. The screens of $V_5$ and $V_6$ are tied together and a 75 volt screen voltage is impressed upon the screens. A pair of capacitors $C_{16}$ and $C_{17}$ provides signal by pass to ground. The plates of $V_5$ and $V_6$ are tied together and the plate load is taken across common plate load resistor $R_{190}$. A side of plate load resistor $R_{190}$ is tied to a 150 volt D.C. voltage power supply source.

As hereinbefore stated, a shaft speed trigger input is taken for every revolution of the antenna rotating shaft. This signal, as stated above, is picked up by inductive pick-off 7 and fed into a wave shaper, from whence positive pulses are fed into the terminal marked on the drawing as shaft speed trigger input. This input is fed into a flip flop gate circuit comprising a pair of triodes V7A and V7B. The flip flop gate circuit supplies unblocking voltage to the suppressor grids of $V_5$ and $V_6$ the gated amplifiers. The positive pulses from the wave shaper are converted to square waves 180° out of phase in the flip flop gate, one square wave being fed to gated amplifier $V_5$ and the square wave 180° out of phase with the first square wave being fed to gated amplifier $V_6$. During the period that a positive portion of the square wave output results, a respective gated amplifier is unblocked and trigger pulses from its respective separator stage are fed through the gated amplifier. Action of the flip flop gate circuit is as follows:

The shaft trigger input from the wave shaper is fed through coupling capacitor $C_{20}$ to the grid of V7A and through $C_{19}$ to the grid of tube V7B. $R_{22}$ is connected at one end to a negative 150 volt D.C. source and at the other end to $R_{25}$. $R_{25}$ in turn being connected to the plate of V7B and to a resistor $R_{27}$ in the plate circuit of V7B. Resistor $R_{27}$ at the end opposite the plate end is connected to a positive 150 volt D.C. source. Resistors $R_{22}$, $R_{25}$ and $R_{27}$ provide a voltage divider one end of which is connected to a negative 150 volt source and the other end of which is connected to a positive 150 volt source. Resistor $R_{22}$ is connected to the grid of V7A at the end opposite the negative voltage source. Resistor $R_{23}$ acts in a similar manner, being connected through the same negative 150 volt D.C. source to a resistor $R_{24}$ and to a junction point between the plate and the plate load resistor $R_{26}$. $R_{26}$ at the end opposite the junction to the plate is connected to a positive 150 volt D.C. voltage source. Resistors $R_{23}$, $R_{24}$ and $R_{26}$ provide a voltage divider similar to the voltage divider provided by resistors $R_{22}$, $R_{25}$ and $R_{27}$. Resistor $R_{23}$ is connected to the grid of V7B at the junction point between resistors $R_{23}$ and $R_{24}$. Resistor $R_{28}$ is a bias resistor in the cathode of V7A and V7B, one end being tied to the negative 150 volt D.C. source and the other end tied to a junction between the cathodes of V7A and V7B. Capacitors $C_{21}$ and $C_{22}$ increase the switching speed of the flip flop from one stable condition to the other by providing a low impedance path for the rapid change in plate voltage to increase action of the tubes until cut-off occurs in a manner to be described later. Resistors $R_{29}$ and $R_{30}$ provide a negative voltage divider to apply correct voltage to the suppressor grids of $V_5$ and $V_6$.

Operation of the flip flop gate is as follows:

The grid biasing of tubes V7A and V7B is below cut-off, permitting discharging when no signal is applied to the grids. As is well understood in the art, the actual electron emission from the cathodes of the tubes is irregular even though tubes V7A and V7B should be identical. Considering a particular instant when the electron emission from the cathode of V7B is an increment greater than the emission at that instant in V7A, there will be a corresponding increase in current through tube V7B causing a drop in the voltage at the point connecting resistors $R_{25}$ and $R_{27}$. Since the grid of V7A is connected through resistor $R_{25}$ to this point, the grid of V7A will become slightly more negative, thus throttling further the flow of electrons through tube V7A, which in turn, will thereby cause an increase in positive voltage at the point at which resistors $R_{24}$ and $R_{26}$ come together. Since the control grid of tube V7B is connected to this point through resistor $R_{24}$, the control grid of V7B will become slightly more positive, thus increasing the flow of electrons through tube V7B. Ultimately, as is well understood in the art, tube V7B and tube V7A will reach a stable condition in which V7A is cut off and V7B is conducting. Then, a positive trigger pulse on being fed into the flip flop gate will not cause appreciable increase in current flow through V7B since V7B is already conducting near the saturation point. The pulse, however, will be impressed upon the grid of tube V7A which will cause conduction of current through that tube. As V7A conducts its plate voltage is reduced sharply with respect to ground. This decrease in plate voltage is transmitted through capacitor $C_{21}$ and resistor $R_{24}$ to the grid of V7B, sharply reducing the grid voltage on that tube. Current in tube V7B then starts to decrease. Voltage at the plate increases, with decrease of current through V7B, with respect to ground. This increase in plate voltage is transmitted through capacitor $C_{22}$ and resistor $R_{25}$ back to the grid of V7A which further increases the current flowing through tube V7A. This action continues during the conduction of V7A and while V7B is decreasing in current flow. Capacitors $C_{21}$ and $C_{22}$ decrease the switching time between the two stable conditions by providing a low impedance coupling path from the plate of each tube to the grid of the other tube. This results in a very fast switching time between the two halves of the flip flop gate. In the flip flop gate, therefore, a series of square waves is produced at the plates and this square wave output is fed through capacitor $C_{23}$ of V7A and potentiometer $R_{20}$ to the suppressor grid of pentode gate $V_6$ and through capacitor $C_{24}$ leading from V7B through potentiometer $R_{21}$ to the suppressor grid of gated amplifier $V_5$. Potentiometers $R_{21}$ and $R_{20}$ provide for adjustment of the unblocking voltage on the suppressor grids of the pentode gate tubes $V_5$ and $V_6$. The trigger pulses from the amplifier V4A and the inverter V4B can pass through their respective gated amplifiers $V_5$ and $V_6$ only during the time that these tubes are unblocked by the output from the flip flop gate. The plates of $V_5$ and $V_6$ are joined together to provide a series of properly spaced groups of triggers at the input of blocking oscillator V8A and V8B. The square wave signal (pedestal) in the output of the gated amplifier which results from the gating signal on a suppressor grid is eliminated by connecting the plates of the two amplifiers to the common plate load resistor $R_{190}$. The gating signals being 180° out of phase with each other, will cancel in the common output providing a uniform reference level for the trigger signal thus eliminating the pedestal.

Referring to Fig. 3, there is shown by steps the development of the trigger pulse pattern found at point O phased properly for the interlaced scanning desired. In graph (a), a wave pattern for the two parallel outputs of the flip flop gate is shown and designated as the blocking waves for convenience. As will be noted, each blocking wave (solid and broken lines, respectively) is one-tenth of a second in duration and represents one complete rotation of the antenna. Fig. 1 illustrates this arrangement, as previously explained. Graph (b) shows the input to tube $V_5$ of the first gated amplifier. It will be recalled that this input consists of a series of evenly spaced trigger pulses which are supplied at the rate of 1800 per second and, thus, in the one-tenth of a second interval marked off on the graph it will receive 180 such pulses. In graph (c), the input to tube $V_6$ of the second gated amplifier is illustrated in dashed lines. The triggered pulses of this input are at the same frequency and magnitude as the input to tube $V_5$ except that there is a displacement of 180° as to phase with respect to the input of tube $V_5$, this displacement being explained above from the action of the phase inverter already described. Thus, the pulses of $V_6$ are located as to phase halfway in between the pulses of $V_5$. By the action of the flip flop gate on the first gated amplifier, in blocking and unblocking the latter in successive one-tenth second intervals, the output of the gated amplifier using tube $V_5$ is as illustrated in graph (d). That is, during the time intervals $t_1$, $t_3$, etc., the positive portions of the blocking wave in solid line are impressed on the suppressor grid of tube $V_5$ causing the latter to become unblocked and thereby to conduct. The output of the gated amplifier having tube $V_6$ is likewise controlled by the second blocking wave (shown in dashed lines) which is 180° displaced from the wave in solid lines. Thus, the output of $V_6$, illustrated in graph (e) is passed in the alternate one-tenth second intervals $t_2$, $t_4$, etc. during which time no output of $V_5$ is permitted. Summing the two outputs of $V_5$ and $V_6$ at point O where the two output leads come together, it is seen in graph (f) that the total of the two outputs is a composite series of triggered pulses during which the end of each succeeding interval $t_1$, $t_2$, $t_3$, etc., is provided with a phase displacement of the triggered pulses. For example, between the intervals $t_1$ and $t_2$ there is only a one-half normal displacement between the two successive pulses. However, between the intervals $t_2$ and $t_3$ there is a full one and one-half interval space between the successive triggered pulses. The significance of this in terms of interlaced scanning is seen in the scanning angle scale below graph (f) where is shown the antenna position in terms of degrees. The antenna makes one complete rotation each one-tenth second or interval $t_1$, $t_2$, etc. During interval $t_1$, for example, scanning pulses as shown on graph (f) occur at even degree points. During interval $t_2$, the pulses occur at odd degrees, and during $t_3$, a return is made to even degree points. This sequence repeats itself indefinitely, illustrating how interlaced scanning is accomplished. The graphs shown in Fig. 3 are shown schematically only since the pulses may take various shapes and sizes, and, of course, the wave pulses of graphs (c), (d) and (e) will in practice be inverted due to the action of tubes $V_5$ and $V_6$ in this respect.

The cycle described by this sequence of events is continually repeated to provide the required timing to produce an interlaced pattern. The output pulses from the gated amplifiers are fed into blocking oscillator V8A and V8B. Capacitor $C_{18}$ provides coupling and resistor $R_{31}$ is the grid resistor across which input trigger voltage is developed. Bias is supplied by resistor $R_{32}$ in the cathode circuit of V8A, the cathode of V8B being directly tied to ground. V8A acts as a trigger amplifier, the plate load being developed across resistor $R_{33}$ which is connected at one end to the plate of V8A and at the other end is tied to a positive 150 plate voltage D.C. source. The amplified trigger pulses are fed through coupling capacitor $C_{26}$ to the grid of V8B. Resistors $R_{36}$ and $R_{35}$ form a voltage divider from a negative 150 volt D.C. source to ground to provide negative bias on the grid of V8B. Capacitor $C_{27}$ acts as a signal by-pass capacitor to ground. Resistor $R_{34}$ provides input developing voltage and a grid return path to ground. In the plate circuit of V8B a transformer T1 comprises a winding from the plate to a positive 150 volt source and a secondary and a tertiary winding, one of the pair leading from capacitor $C_{28}$ to ground and the other secondary winding providing phase shifted trigger output to be fed to an electronic indicator system. These triggers may be applied to various forms of indicating systems, such as commonly used in radar, sonar, television, automatic control systems, etc. and, as explained above, to a radar transmitter.

Operation of V8B as a blocking oscillator is as follows: Normally tube V8B is not conducting, the bias through resistor $R_{34}$ from the junction point between resistors $R_{35}$ and $R_{36}$ biases this tube to cut-off. A positive pulse from trigger amplifier V8A impressed on the grid of the tube V8B causes plate current to flow, the plate current flowing through the primary winding of transformer $T_1$.

As plate current flows through the primary winding of blocking oscillator transformer $T_1$, it induces a voltage into the secondary winding of this transformer. This induced voltage is fed back through capacitor $C_{28}$ and applied to the grid of tube V8B. The applied voltage on the grid is of such phase that it tends to further increase the plate current in blocking oscillator V8B, thus causing a regenerative increase in the plate current of this tube. As this regenerative increase in plate current and grid voltage continues, the tube operates on a higher and higher mutual conductance characteristic. This gives rise to a very sharp pulse of current in the primary of the transformer $T_1$. Voltage rise at the grid of the blocking oscillator V8B continues until the grid is driven positive with respect to the cathode. At this point grid current begins to flow and the grid to cathode impedance of the tube V8B becomes very low. This low impedance in the secondary of transformer $T_1$ presents a heavy load to the primary of the transformer. Power dissipation in the grid circuit, internal losses of the tube, and in the load in the blocking oscillator increases to a point where they can no longer be supplied by the plate circuit. The plate voltage of tube V8B drops to a low value due to the heavy current through the primary winding of pulse transformer $T_1$ which causes a reduction in the mutual conductance of the tube.

The flow of grid current when the grid of the blocking oscillator tube is driven positive charges capacitor $C_{28}$ to a voltage which is opposite in polarity to the feed back voltage applied to the grid. Ultimately, the voltage across this capacitor increases to a point where the feed back voltage is insufficient to increase or maintain the voltage at the grid of the tube. Thus these conditions acting together cause the regenerative increase in plate current of the tube to stop and an equilibrium condition is reached. During the condition of equilibrium the plate current in vacuum tube V8B is no longer changing and due to the stationary flux linking the secondary of transformer $T_1$ a feedback voltage in the secondary of $T_1$ will no longer be induced. Equilibrium will be maintained while the magnetizing current discharges from the secondary winding of transformer $T_1$. In the absence of feedback voltage the negative charge on capacitor $C_{28}$ will cause the grid to go negative with respect to the cathode. This causes a decrease in plate current which induces a voltage into the secondary winding in such a way as to cause the grid to go further negative. This cycle of events continues and causes a rapid degenerative turn off of plate current in the blocking oscillator tube V8B. Cut-off bias is soon reached, thus finishing the generation of the rectangular pulse. Since the grid of V8B is now negative, current will not flow through the tube but the charge on capacitor $C_{28}$ decays through resistor $R_{34}$. In a time equal to the time constant of $C_{28}$ and $R_{34}$ the negative charge on the grid will have decayed to the normal operating bias voltage of the tube. The tube is then ready to fire and produce another pulse upon the application of a succeeding positive trigger pulse. The rectangular pulse generated by tube V8B is coupled to the output winding or tertiary of transformer $T_1$ where it can be delivered to an oscilloscope or other indicator. The blocking oscillator serves to provide a low impedance source of rectangular trigger pulses that have a fast rise and fall time. That is, a series of positive pulses with rapid rise and fall time and of high amplitude and low source impedance is developed in the tertiary coil which output may be fed to the input stages of an electronic system to be triggered.

From the above description with reference to the drawings it may readily be seen that a new and improved synchronized system of interlaced scanning for a rapid scan radar system for television, for automatic control and for use in other applications has been described whereby positive self-synchronized interlace of high accuracy and greatly improved stability, greater economy, less requirement for accuracy of circuit performance and a more efficient and simplified apparatus and method has been presented. Examples of use in other applications might be the developing of a sequence of timing pulses of the same nature as those required for synchronizing an interlace pattern, to synchronize the operations of an automatic control application.

Since certain changes in this invention may be made without departing from the spirit and scope thereof it is intended that all matters contained in the foregoing description and shown in the accompanying drawings shall be interpreted as illustrative and not in a limiting sense. The interlaced principle can be accomplished by many variations and combinations of pick-up devices, generators, or transducers for supplying the synchronizing signals. Obviously, variations of the electrical circuitry are also possible and will be determined by the particular application. For application to radar, for example, the shaft speed trigger could be developed by an electronic counting circuit dividing the generator frequency by the number of cycles per revolution. The repetition frequency could be generated by a separate electron tube oscillator rather than the shaft-coupled alternating current generator. Variations in electronic circuits for accomplishing the output required of components of the system and redesigned within the limits of electronic engineering skill are very possible and it is not to be interpreted that the particular circuitry to be shown or parts are to be otherwise construed than as illustrative of the principles of the invention.

Obviously, many modifications and variations of the present invention are possible in the light of the above teachings. It is, therefore, to be understood that within the scope of the appended claims the invention may be practiced otherwise than as specifically described.

What is claimed is:

1. Apparatus for producing an interlaced scan pattern on an indicating device corresponding to an interlaced scan by a scanning device, said apparatus comprising means to produce a first series of triggers synchronized with said scanning device, means to produce a second series of triggers 180° removed in phase from said first series of triggers, pick-off means to initiate a pick-off trigger at the same time interval for each scan period of said scanning device, means to provide a first unblocking voltage coincident with said pick-off trigger, means to provide a second unblocking voltage 180° removed in phase from said first unblocking voltage, a first gated amplifier unblocked by said second unblocking voltage, a second gated amplifier unblocked by said first unblocking voltage, means to deliver the first series of triggers to said first gated amplifier for passing therethrough when the latter is in unblocked condition, means to deliver the second series of triggers to said second gated amplifier for passing therethrough when the latter is in unblocked condition, common output means from said gated amplifiers to provide a first series of pulses followed by a time interval of three halves the distance between any two pulses of the first series of pulses, in turn followed by a second series of pulses in turn followed by a second time interval equal to one half the time interval between any two pulses of the second series of pulses, the wave form pattern being repetitive, the time interval between any two pulses of the first series being identical to the time interval between any two pulses of the second series.

2. A synchronized system of interlaced scanning of the character described comprising a first means to produce electrical pulses, a second means synchronized mechanically with said first means to produce square waves, amplifying and differentiating means to amplify and produce positive and negative pulses from a portion of said square waves, means to invert and differentiate a second portion of said square waves producing output pulses 180° removed in phase from the output pulses of said amplifier and differentiator means, a first separator to pass through only positive pulses from said amplifier and differentiator means, a second separator to pass through only positive pulses from said inverter and differentiator means, positive pulses from said first separator remaining 180° in phase removed from the positive pulses from said second separator, a first gated amplifier to receive pulses from said first separator, a second gated amplifier to receive pulses from said second separator, means to shape said electrical pulses from said first means and provide positive pulses, flip-flop gate means to convert the latter positive pulses to a first square wave output and a second square wave output, said second square wave being removed 180° in phase from said first square wave output, means to feed said first output from said flip-flop gate to said first gated amplifier to unblock said first gated amplifier and said second output from said flip-flop gate to said second gated amplifier to unblock said second gated amplifier causing alternately one of said gated amplifiers to be on while the other said gated amplifier is off, and means recombining the output pulses of said first and second gated amplifiers.

3. A synchronized system of interlaced scanning of the character described comprising an antenna drive shaft, signal generating means mechanically linked to said antenna drive shaft, means to shape signals from said generating means to an approximately square wave output, differentiating and inverter means to produce a pair of separate signals each consisting of positive and negative pulses from said square wave output and spaced apart 180° in phase from each other, means to eliminate the negative pulses from both said signals, a first gated amplifier receiving as input one of said pair of separate signals, a second gated amplifier receiving as input the other of said pair of separate signals, a common point receiving the outputs of both said gated amplifiers, pick-up means synchronized to generate signals in accordance with a predetermined position of said antenna drive shaft, shaping means to transform said pick-up signals to trigger pulses, flip-flop gate means to convert said pick-up signal trigger pulses to a first series of square waves and a second series of square waves apart in phase by 180°, means to feed said first series of square waves into said first gated amplifier, means to feed said second series of square waves into said second gated amplifier to block and unblock alternatively each of said gated amplifiers in succession to permit passage through said amplifiers to said common point a resultant signal which is composed of a sequence of signals corresponding with the alternate unblocking of each of said gated amplifiers.

4. Apparatus comprising an antenna rotating shaft, a generator driven by said shaft generating sine waves, means to convert said sine waves to square waves, first differentiator means to convert said square waves to a first series of alternately following positive and negative trigger pulses, inverter means to invert a portion of said square waves, second differentiator means to differentiate said inverted square waves to produce a second series of alternate negative and positive trigger pulses, said second series being 180° in phase removed from said first trigger pulse series, separator circuit means to remove the negative trigger pulses from said two series of trigger pulses, a first gated amplifier to receive said first series of positive trigger pulses, a second gated amplifier to receive said second series of positive trigger pulses, inductor means mounted on said rotating shaft for generating a series of pulses by generating one pulse with each rotation of said shaft, a wave shaper to convert said pulses into trigger pulses, a flip-flop gating means to convert said trigger pulses to a first square wave output and a second square wave output, said second square wave output being 180° in phase removed from said first square wave output, one of said square wave outputs being fed to said first gated amplifier, the second of said square wave outputs from said flip-flop gate being fed to said second gated amplifier, said gated amplifiers being selectively turned on and off, respectively, by positive and negative portions of said square wave outputs from said flip-flop gate, means tying together the outputs of said gated amplifiers, and a blocking oscillator coupled to be energized by the output signals from said gated amplifiers.

5. Apparatus of the character described comprising scanning antenna means, means to develop a signal pulse at a predetermined antenna position in each scan, means to generate a recurring signal in synchronism with said scanning antenna means, means to separate said recurring signal into a first series of pulses and a second series of pulses 180° removed in phase from said first series of pulses, a first gate and a second gate, means responsive to said position signal pulse to turn on and off alternately said first gate and second gate for successive scans of said antenna means, means to feed said first series of pulses to said first gate, means to feed said second series of pulses to said second gate, common output means at the outputs of said gates to form a composite wave output comprising a first plurality of pulses followed by a first time interval and a second plurality of pulses followed by a second time interval of different duration than said first time interval, and said first series of pulses followed by said first time interval and second series of pulses followed by said second time interval continuously recurring.

6. Apparatus of the character described for producing an interlaced scanning pattern comprising a first gated amplifier, a second gated amplifier, means to provide unblocking voltage alternatively for said first and second gated amplifiers, field trigger generating means for timing said unblocking voltage means, means for producing a sine wave synchronized with said field trigger generating means at a frequency being a multiple of said field trigger generating means frequency, wave shaping means to convert said sine wave to a square wave, means to produce first and second amplified outputs of said square wave separated in phase by 180°, means differentiating said first and second square waves producing two series of positive and negative pulses, first and second separator means for passing only said positive pulses in said two series of pulses, means feeding the output of said first separator means to said first gated amplifier, means feeding the output of said second separator means to said second gated amplifier, common output terminal means coupled to said gated amplifiers whereby there appears at said output terminal means a signal comprising a series of pulses from one of said series of pulses and a successive series of pulses from the other of said two series of pulses followed again by the pulses from the first of said two series of pulses, means having a low impedance output circuit and a high impedance input circuit, and means coupling said high impedance input circuit to said common output terminal means.

7. In an apparatus of the character described, means for generating a first sine wave output, means for generating a series of field triggers having a repetition rate that is a submultiple of the frequency of said sine wave output, means for shaping said sine wave to a square wave output, means for amplifying and differentiating said square wave output to produce a first series of positive and negative triggers, means for inverting and differentiating a portion of said square wave output to produce a second series of negative and positive triggers 180° shifted in phase from said first series of positive and negative triggers, means for separating said positive triggers of each of the series of triggers from the negative portions to only permit positive output, means shaping said field triggers to produce a series of relatively sharp pulses, means for generating a first series of square waves and a second series of square waves from said sharp pulses, said first series of square waves being 180° out of phase with respect to said second series of square waves, means for gating said first series of positive triggers with said first series of square waves, means for gating said second series of positive triggers with said second series of square waves, and means for combining the gated first and second series of positive triggers forming a series of pulses separated by alternate time intervals of different durations.

References Cited in the file of this patent

UNITED STATES PATENTS

| | | |
|---|---|---|
| 2,086,918 | Luck | July 13, 1937 |
| 2,426,225 | Krause | Aug. 26, 1947 |
| 2,435,958 | Dean | Feb. 17, 1948 |
| 2,666,198 | Wallace | Jan. 12, 1954 |
| 2,716,189 | Ayres | Aug. 23, 1955 |